US009594517B2

(12) United States Patent
Hasegawa (10) Patent No.: US 9,594,517 B2
(45) Date of Patent: Mar. 14, 2017

(54) VEHICLE DEVICE

(71) Applicant: DENSO CORPORATION, Kariya, Aichi-pref. (JP)

(72) Inventor: Takaomi Hasegawa, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 67 days.

(21) Appl. No.: 14/761,273

(22) PCT Filed: Dec. 12, 2013

(86) PCT No.: PCT/JP2013/007320
§ 371 (c)(1),
(2) Date: Jul. 15, 2015

(87) PCT Pub. No.: WO2014/112006
PCT Pub. Date: Jul. 24, 2014

(65) Prior Publication Data
US 2015/0363122 A1  Dec. 17, 2015

(30) Foreign Application Priority Data

Jan. 17, 2013 (JP) ................................ 2013-006337

(51) Int. Cl.
G06F 12/00 (2006.01)
G06F 13/00 (2006.01)
(Continued)

(52) U.S. Cl.
CPC .......... *G06F 3/0617* (2013.01); *G06F 3/0653* (2013.01); *G06F 3/0659* (2013.01);
(Continued)

(58) Field of Classification Search
CPC ............ G06F 11/1441; G06F 11/2015; G06F 3/0617; G06F 3/0653; G06F 3/0659; G06F 3/0683
(Continued)

(56) References Cited

U.S. PATENT DOCUMENTS 5,499,182 A * 3/1996 Ousborne ............ G07C 5/0858
340/439
2005/0033492 A1* 2/2005 Mendelson ........... B60W 30/00
701/33.4
(Continued)

FOREIGN PATENT DOCUMENTS

JP          H11306094 A     11/1999
JP          2001195314 A     7/2001
(Continued)

OTHER PUBLICATIONS

International Search Report and Written Opinion (in Japanese with English Translation) for PCT/JP2013/007320, mailed Mar. 18, 2014; ISA/JP.

*Primary Examiner* — Sheng-Jen Tsai
(74) *Attorney, Agent, or Firm* — Harness, Dickey & Pierce, P.L.C.

(57) ABSTRACT

A vehicle device is provided that includes a first processer for processing first data classified as a first category when being supplied based on a vehicle-mounted power source, a second processor for processing second data classified as a second category when being supplied based on the vehicle-mounted power source, an external data storage externally attached to both the first and second processors, and a built-in data storage provided in the second processor and capable of retaining the stored second data even if a battery voltage decreases to a predetermined value for a predetermined period of time. At least one of the first and second processors varies a storage destination and a storage frequency in accordance with priorities. The second processor (Continued)

| | MOST IMPORTANT DATA | IMPORTANT DATA | UNIMPORTANT DATA |
|---|---|---|---|
| CATEGORY | LOSS OF DATA EXERTS EXTREMELY SIGNIFICANT INFLUENCE ON USER | LOSS OF DATA EXERTS LESS SIGNIFICANT INFLUENCE ON USER THAN MOST IMPORTANT DATA | LOSS OF DATA EXERTS INSIGNIFICANT INFLUENCE ON USER |
| HANDLING | DATA IS RETAINED EVEN IN EVENT OF 0-V, 50-ms MOMENTARY POWER INTERRUPTION | DATA BEING WRITTEN IS LOST IN EVENT OF 0-V, 1-ms MOMENTARY POWER INTERRUPTION | DATA AT PREVIOUS ACC-OFF IS RESTORED IN EVENT OF 0-V, 1-ms MOMENTARY POWER INTERRUPTION |
| STORAGE DESTINATION AND STORAGE FREQUENCY | RAM (AT ALL TIMES) | EXTERNAL MEMORIES (WHEN SPECIFIC TIME PERIOD ELAPSES OR DATA IS CHANGED) | EXTERNAL MEMORIES (WHEN ACC IS SWITCHED FROM ON TO OFF) |
| DATA | LOCATION DATA INDICATING CURRENT LOCATION, ETC. | LOCATION DATA INDICATING HOME LOCATION, ETC. | APPLICATION DATA, ETC. | constantly stores at least part of the second data in the built-in data storage.

11 Claims, 6 Drawing Sheets

(51) Int. Cl.
    *G06F 13/28*     (2006.01)
    *G06F 3/06*     (2006.01)
    *G06F 11/14*     (2006.01)
    *G06F 11/20*     (2006.01)

(52) U.S. Cl.
    CPC ........ *G06F 3/0683* (2013.01); *G06F 11/1441* (2013.01); *G06F 11/2015* (2013.01)

(58) Field of Classification Search
    USPC .......................................................... 711/154
    See application file for complete search history.

(56) References Cited

U.S. PATENT DOCUMENTS

| | | | |
|---|---|---|---|
| 2006/0236026 A1* | 10/2006 | Hempel | G06F 12/1425 711/103 |
| 2007/0294583 A1* | 12/2007 | Traskov | G06F 11/3648 714/37 |
| 2008/0072040 A1* | 3/2008 | Asano | G11B 20/00086 713/158 |
| 2008/0155257 A1* | 6/2008 | Werner | H04L 9/3226 713/168 |
| 2011/0251821 A1* | 10/2011 | Mueller | G06F 11/2236 702/123 |
| 2013/0339739 A1* | 12/2013 | Hueber | G06F 21/72 713/171 |
| 2014/0283136 A1* | 9/2014 | Dougherty | G01S 5/00 726/29 |

FOREIGN PATENT DOCUMENTS

| | | |
|---|---|---|
| JP | 2002024101 A | 1/2002 |
| JP | 2002067834 A | 3/2002 |
| JP | 2003104137 A | 4/2003 |
| JP | 2007102566 A | 4/2007 |
| JP | 2008052440 A | 3/2008 |
| JP | 2008077221 A | 4/2008 |
| JP | 2010117752 A | 5/2010 |

* cited by examiner

| CATEGORY | MOST IMPORTANT DATA | IMPORTANT DATA | UNIMPORTANT DATA |
|---|---|---|---|
| HANDLING | LOSS OF DATA EXERTS EXTREMELY SIGNIFICANT INFLUENCE ON USER | LOSS OF DATA EXERTS LESS SIGNIFICANT INFLUENCE ON USER THAN MOST IMPORTANT DATA | LOSS OF DATA EXERTS INSIGNIFICANT INFLUENCE ON USER |
| | DATA IS RETAINED EVEN IN EVENT OF 0-V, 50-ms MOMENTARY POWER INTERRUPTION | DATA BEING WRITTEN IS LOST IN EVENT OF 0-V, 1-ms MOMENTARY POWER INTERRUPTION | DATA AT PREVIOUS ACC-OFF IS RESTORED IN EVENT OF 0-V, 1-ms MOMENTARY POWER INTERRUPTION |
| STORAGE DESTINATION AND STORAGE FREQUENCY | RAM (AT ALL TIMES) | EXTERNAL MEMORIES (WHEN SPECIFIC TIME PERIOD ELAPSES OR DATA IS CHANGED) | EXTERNAL MEMORIES (WHEN ACC IS SWITCHED FROM ON TO OFF) |
| DATA | LOCATION DATA INDICATING CURRENT LOCATION, ETC. | LOCATION DATA INDICATING HOME LOCATION, ETC. | APPLICATION DATA, ETC. |

| TIMESTAMP | BUILT-IN RAM | EXTERNAL MEMORY | |
|---|---|---|---|
| t=1 | LOCATION DATA AT t=1 <br> ↓UPDATE | LOCATION DATA AT t=1 <br> ↓UPDATE | COPY TO ANOTHER AREA |
| t=2 | LOCATION DATA AT t=2 <br> ↓UPDATE | LOCATION DATA AT t=2 <br> ↓UPDATE | LOCATION DATA AT t=1 <br> COPY TO ANOTHER AREA |
| t=3 | LOCATION DATA AT t=3 <br> ↓UPDATE | LOCATION DATA AT t=3 <br> ↓UPDATE | LOCATION DATA AT t=2 <br> COPY TO ANOTHER AREA |
| t=4 | LOCATION DATA AT t=4 <br> ↓UPDATE | LOCATION DATA AT t=4 <br> ↓UPDATE | LOCATION DATA AT t=3 <br> COPY TO ANOTHER AREA |
| t=5 | LOCATION DATA AT t=5 <br> ↓UPDATE | LOCATION DATA AT t=5 <br> ↓UPDATE | LOCATION DATA AT t=4 <br> COPY TO ANOTHER AREA |
| ⋮ | ⋮ | ⋮ | ⋮ |

VEHICLE DEVICE

CROSS-REFERENCE TO RELATED APPLICATIONS

This application is a U.S. National Phase Application under 35 U.S.C. 371 of International Application No. PCT/JP2013/007320 filed on Dec. 12, 2013 and published in Japanese as WO 2014/112006 A1 on Jul. 24, 2014. This application is based on and claims the benefit of priority from Japanese Patent Application No. 2013-006337 filed on Jan. 17, 2013. The entire disclosures of all of the above applications are incorporated herein by reference.

TECHNICAL FIELD

The present disclosure relates to a vehicle device including an external data storage unit and a built-in data storage unit. The external data storage unit is externally attached to a data processing unit that processes data. The built-in data storage unit is built in the data processing unit.

BACKGROUND ART

A vehicle device used, for instance, for a car navigation device needs to store (back up) a wide variety of data. Meanwhile, in a vehicle environment, the voltage value of a battery voltage supplied from a vehicle-mounted power source (vehicle-mounted battery) may occasionally decrease (the battery voltage may be occasionally interrupted) for a moment due, for instance, to cranking at engine startup or vibration-induced temporary connector disconnection. A remedial action taken in the past when the battery voltage was momentarily interrupted was, for example, to instantaneously switch a microcomputer from an awake state to a sleep state or connect a large-capacity capacitor. In recent years, however, it is difficult to take such a remedial action due to cost and size considerations because the power consumption of microcomputers has been increased. Incidentally, a technology for retaining stored data (preventing the loss of stored data) is disclosed in Patent Literature 1.

CITATION LIST

Patent Literature

Patent Literature 1: Japanese Unexamined Patent Application Publication No. 2008-77221

SUMMARY OF INVENTION

The technology disclosed in Patent Literature 1 provides increased reliability for data retention operations. However, studies conducted by the applicants of the present disclosure indicate that it is difficult to properly retain data in a vehicle environment in which the battery voltage may be momentarily interrupted as described above.

The present disclosure has been made in view of the above circumstances. An object of the present disclosure is to provide a vehicle device that is capable of properly retaining stored data even when a battery voltage supplied from a vehicle-mounted power source is momentarily interrupted.

A vehicle device according to an aspect of the present disclosure includes a first data processing unit, a second data processing unit, an external data storage unit, and a built-in data storage unit. The first data processing unit processes first data classified as a first category when the first data processing unit is supplied with a first operating voltage that is based on a battery voltage supplied from a vehicle-mounted power source. The second data processing unit processes second data classified as a second category different from the first category when the second data processing unit is supplied with a second operating voltage that is based on the battery voltage supplied from the vehicle-mounted power source. The external data storage unit is externally attached to both the first data processing unit and the second data processing unit and is capable of storing at least one of the first data and the second data. The built-in data storage unit is built in the second data processing unit and is capable of retaining the stored second data even if a voltage value of the battery voltage decreases to a predetermined value for a predetermined period of time. At least one of the first data processing unit and the second data processing unit varies a storage destination and a storage frequency in accordance with priorities assigned to the first data and the second data. The second data processing unit constantly stores at least part of the second data in the built-in data storage unit.

According to the above-described vehicle device, when most important data out of the second data processed by the second data processing unit (data the loss of which exerts an extremely great influence upon a user) can be classified as the most important data and constantly stored in the built-in data storage unit, the stored data classified as the most important data can be properly retained (prevented from being lost) even if the voltage value of the battery voltage decreases to the predetermined value for the predetermined period of time, that is, even if the battery voltage is momentarily interrupted.

BRIEF DESCRIPTION OF DRAWINGS

The above and other objects, features, and advantages of the present disclosure will become more apparent from the following detailed description given with reference to the accompanying drawings, in which.

DESCRIPTION OF EMBODIMENTS

First Embodiment

Figure 1:
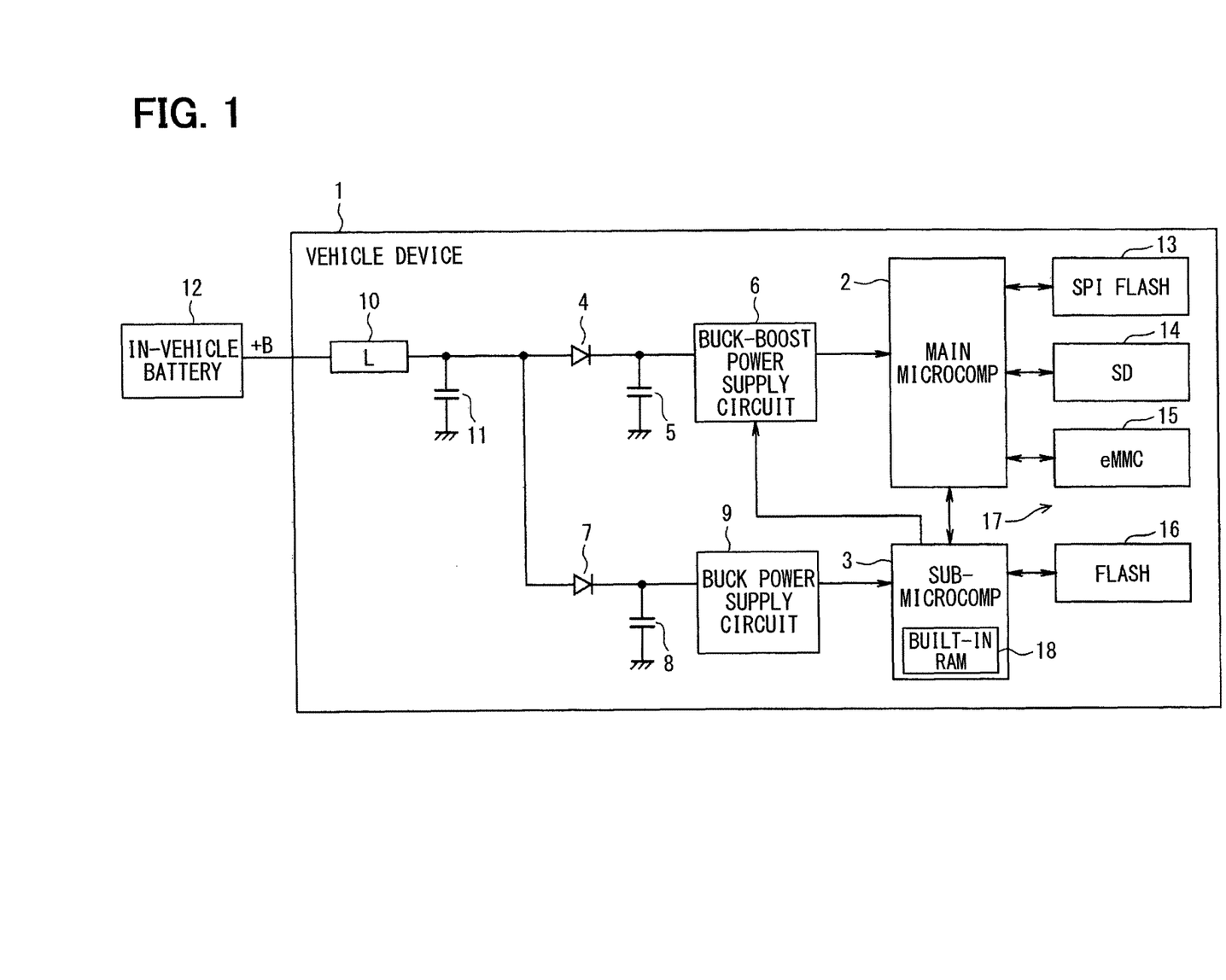
FIG. 1 is a functional block diagram illustrating a vehicle device according to a first embodiment of the present disclosure.
Figure 2:
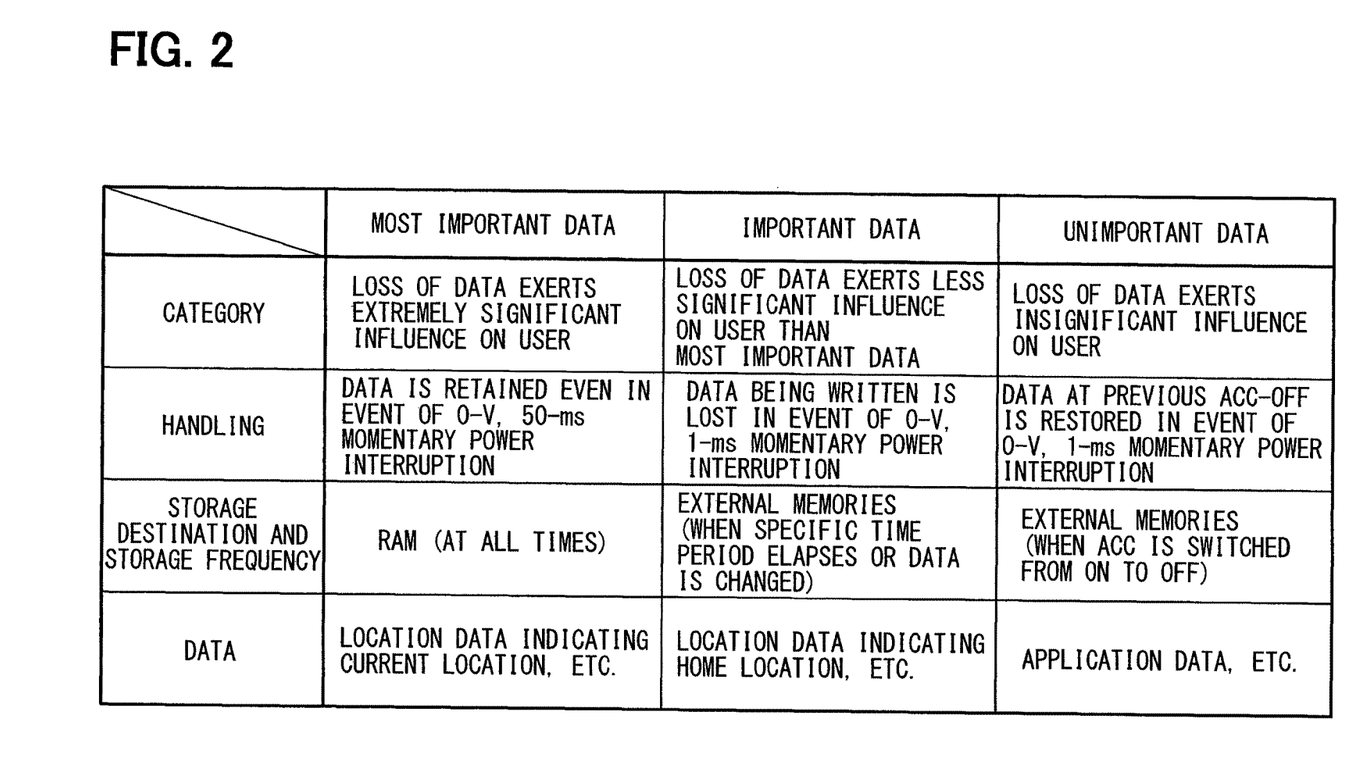
FIG. 2 is a diagram illustrating a storage destination and a storage frequency that are based on priorities of data.
Figure 3:
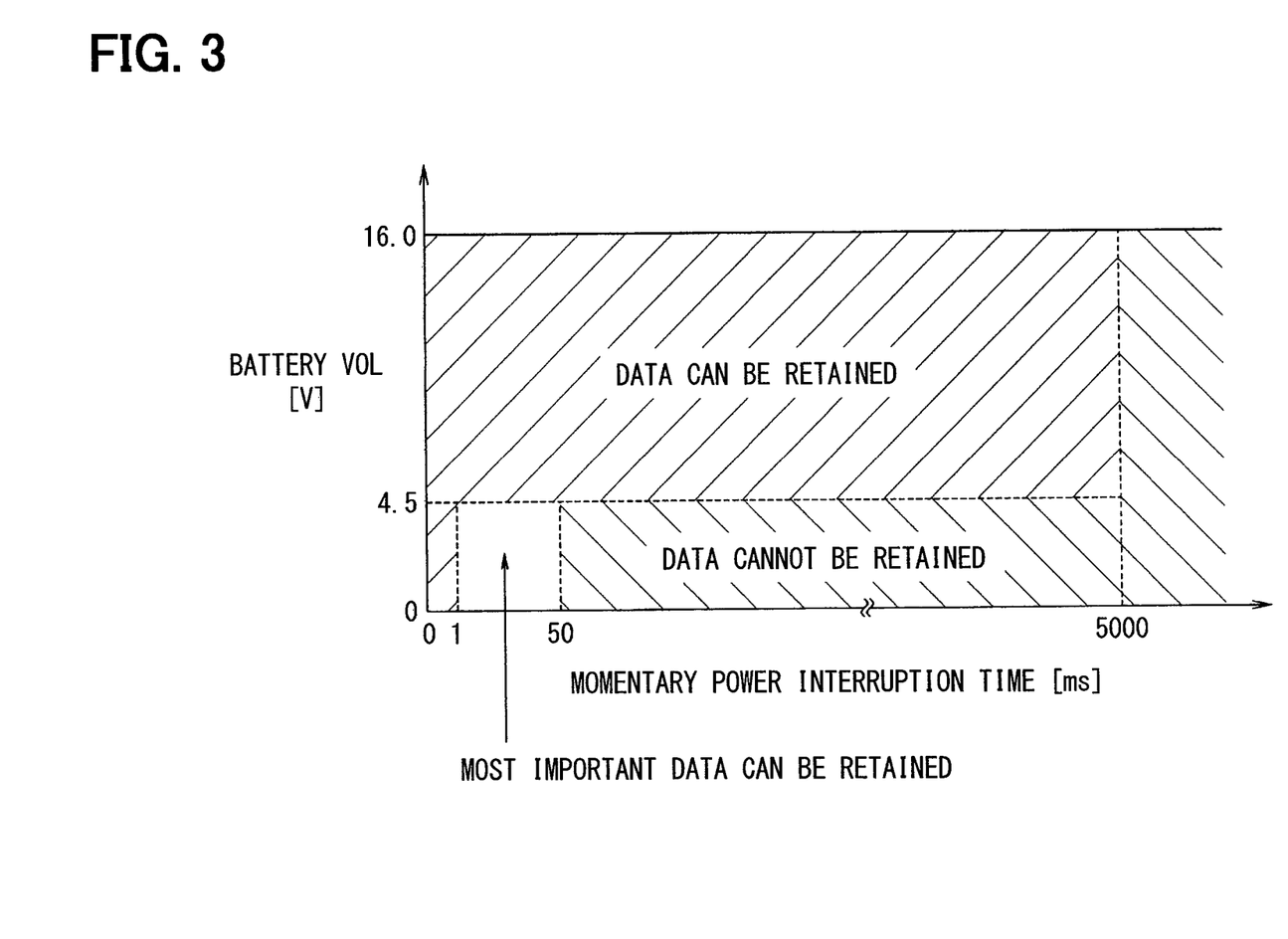
FIG. 3 is a diagram illustrating data retainability with respect to battery voltage and its momentary interruption time.

A first embodiment of the present disclosure will now be described with reference to FIGS. 1 to 3. A vehicle device 1 can be mounted in a vehicle, and includes a main microcomputer 2 and sub-microcomputer 3. A diode 4, a capacitor 5, and a buck-boost power supply circuit 6 are connected to an input stage of the main microcomputer 2. A diode 7, a capacitor 8, and a buck power supply circuit 9 are connected to an input stage of the sub-microcomputer 3. A capacitor 11 is connected between an inductor 10 and the diodes 4, 7. The main microcomputer 2 corresponds to an example of a first data processing unit or first data processing means. The sub-microcomputer 3 corresponds to an example of a second data processing unit or second data processing means.

The buck-boost power supply circuit 6 uses a voltage setting equivalent to a first voltage value (for example, 5 V). When a battery voltage is supplied from a vehicle-mounted power source (vehicle-mounted battery) 12 through the inductor 10 and the diode 4, the buck-boost power supply circuit 6 increases or decreases the supplied battery voltage to the first voltage value to generate a power supply voltage having the first voltage value, and supplies the generated power supply voltage to the main microcomputer 2 as an operating voltage.

The buck power supply circuit 9 uses a voltage setting equivalent to a second voltage value (for example, 3.3 V). When the battery voltage is supplied from the vehicle-mounted power source 12 through the inductor 10 and the diode 7, the buck power supply circuit 9 decreases the supplied battery voltage to the second voltage value to generate a power supply voltage having the second voltage value, and supplies the generated power supply voltage to the sub-microcomputer 3 as an operating voltage. In other words, the above-described configuration is such that the battery voltage from the vehicle-mounted power source 12 is supplied by using different paths, namely, a path for supplying the battery voltage to the main microcomputer 2 and a path for supplying the battery voltage to the sub-microcomputer 3.

The main microcomputer 2 is driven in a state where the operating voltage is supplied from the buck-boost power supply circuit 6. In such a driven state, the main microcomputer 2 processes data related, for instance, to audio, radio, television, and distributed applications, which are specifically adapted to provide entertainment to a user (first data classified as a first category and data dedicated to user applications). The main microcomputer 2 consumes a relatively large amount of electric power. Therefore, if the battery is momentarily interrupted as described earlier, it is difficult for the capacitor 5 and other elements to ensure the operation of the main microcomputer 2.

The sub-microcomputer 3 is driven in a state where the operating voltage is supplied from the buck power supply circuit 9. In such a driven state, the sub-microcomputer 3 processes data related, for instance, to a current vehicle location, periphery monitoring, and vehicle-mounted network information, which are specifically adapted to provide vehicle stability and safety to the user (second data classified as a second category and data dedicated to vehicle control). The sub-microcomputer 3 consumes a relatively small amount of electric power. Therefore, if the battery voltage is momentarily interrupted as described earlier, the capacitor 8 and other elements can ensure the operation of the sub-microcomputer 3 to a certain extent. Further, the sub-microcomputer 3 outputs a control signal to the buck-boost power supply circuit 6 in order to control the supply of the operating voltage from the buck-boost power supply circuit 6 to the main microcomputer 2. Furthermore, the sub-microcomputer 3 inputs a status notification signal from the main microcomputer 2 in order to monitor the operating status of the main microcomputer 2.

An SPI flash memory 13, a secure digital card (SD card) 14, and an embedded multi-media card (eMMC) 15 are connected (externally attached) to the main microcomputer 2 as data storage (backup) memories. Further, a flash memory 16 is connected (externally attached) to the sub-microcomputer 3 as a data storage memory. The SPI flash memory 13, the SD card 14, the eMMC 15, and the flash memory 16 are external memories 17 provided separately for the main microcomputer 2 or the sub-microcomputer 3. In addition, a random access memory (RAM) 18 is built in the sub-microcomputer 3. The RAM 18 corresponds to an example of a built-in data storage unit or built-in data storage means. The external memories 17 correspond to an example of an external data storage unit or external data storage means.

The external memories 17 and the built-in RAM 18 differ in capacity and maximum write count. For example, the SPI flash memory 13 has a capacity of 8 MB and a maximum write count of 100,000, the SD card 14 has a capacity of 8 GB and a maximum write count of 100, the eMMC 15 has a capacity of 4 GB and a maximum write count of 100, the flash memory 16 has a capacity of 4 MB and a maximum write count of 100,000, and the built-in RAM 18 has a capacity of 4 MB.

The above-mentioned vehicle device 1, if it is, for example, a car navigation device, includes not only the above-mentioned functional blocks, but also various other functional blocks (not shown) that implement, for example, a function for identifying the current location of the vehicle, a function for performing map matching on road data to indicate the vehicle's current location, a function for setting a destination, a function for searching for a route to a destination from the vehicle's current location, and a function for drawing, for example, routes, maps, and intersections.

Incidentally, in a vehicle environment, the voltage value of the battery voltage supplied from the vehicle-mounted power source 12 may momentarily decrease, that is, the battery voltage may be momentarily interrupted, due, for instance, to cranking at engine startup or vibration-induced temporary connector disconnection. In order to provide against such a battery voltage interruption, the vehicle device 1 needs to store (back up) data. However, if an employed configuration is such that the vehicle device 1 constantly stores all data to be processed (the data to be processed by the main microcomputer 2 and the sub-microcomputer 3), a data write count may unnecessarily increase to readily exceed the maximum write count or run out of capacity. If such a situation occurs, the vehicle is not up to its expectations (fails to provide a 10-year guaranty or a 100,000-km guaranty). In view of such circumstances, the first embodiment assigns priorities to data to be processed by the vehicle device 1 and varies a data storage destination and frequency in accordance with the priorities. More specifically, the vehicle device 1 classifies (stratifies) all data to be processed by the main microcomputer 2 and the sub-microcomputer 3 into the most important data, important data, or unimportant data, and varies the storage destination and frequency in accordance with the result of classification. Modes of storing the most important data, important data, and unimportant data will be sequentially described below.

(1) Mode of Storing the Most Important Data

The vehicle device 1 constantly stores the most important data in the built-in RAM 18 of the sub-microcomputer 3. Thus, even if the voltage value of the operating voltage supplied to the sub-microcomputer 3 remains as low as a predetermined value (for example, 0 V) for a predetermined period of time (for example, 50 ms) due to momentary battery voltage interruption, the stored most important data can be retained (prevented from being lost). The predetermined value and the predetermined period of time are merely exemplified and are dependent on the maximum amount of electric power that can be supplied to the sub-microcomputer 3 in the event of momentary battery voltage interruption (dependent, for example, on the capacity of an installed capacitor having a practical size). Further, when the battery voltage is momentarily interrupted, the sub-microcomputer 3 outputs a control signal to the buck-boost power supply circuit 6 in order to stop the main microcomputer 2 by shutting off the supply of the operating voltage from the buck-boost power supply circuit 6 to the main microcomputer 2 after an elapse of an extremely short period of time (for example, 1 ms) since momentary battery voltage interruption. This reduces the power consumption of the main microcomputer 2. Subsequently, the sub-microcomputer 3 switches from an awake state (normal operating state) to a sleep state (low-power operating state) in order to reduce its power consumption. In other words, the sub-microcomputer 3 stops the main microcomputer 2, then switches from the awake state to the sleep state, and inputs the status notification signal from the main microcomputer 2 in order to monitor the operating status of the main microcomputer 2 while reducing its power consumption. When the most important data is lost, it may exert an extremely significant influence upon the user (cause an inconvenience to the user). The most important data includes, for example, global positioning system (GPS) data and other location data indicative of the vehicle's current location.

(2) Mode of Storing Important Data

The vehicle device 1 uses an immediate data backup method to store important data in the external memories 17. The immediate data backup method is a method of storing data when a predetermined period of time elapses or the data is changed (when a predetermined condition is established). More specifically, the main microcomputer 2 and the sub-microcomputer 3 both have a timer function. Therefore, when it is determined that the predetermined period of time has elapsed or when data classified as the important data is determined to be changed, the main microcomputer 2 and the sub-microcomputer 3 store the important data in the external memories 17 no matter whether the battery voltage is momentarily interrupted. However, in an exceptional case where the battery voltage is momentarily interrupted while data is being written, the data cannot be stored. If, for instance, the voltage value of the operating voltage supplied to the main microcomputer 2 and the sub-microcomputer 3 remains as low as a predetermined value (for example, 0 V) for a predetermined period of time (for example, 1 ms) due to momentary battery voltage interruption, the data being written is lost. The loss of the important data exerts a less significant influence upon the user than the loss of the most important data (the possibility of the important data causing an inconvenience to the user is lower than in the case of the most important data). The important data is, for example, location data indicative of a user-registered location of a user's home.

(3) Mode of Storing Unimportant Data

The vehicle device 1 stores unimportant data in the external memories 17 when an accessory (ACC) switch (a predetermined switch in the vehicle) is switched from on to off (when a predetermined condition is established). More specifically, when the ACC switch is determined to be switched from on to off, the main microcomputer 2 and the sub-microcomputer 3 store data classified as the unimportant data in the external memories 17. If the battery voltage is momentarily interrupted during a unit trip in a situation where a period between ACC switch on and ACC switch off is defined as a trip, the data corresponding to the trip is lost so that the remaining data reverts to the data existing the last time the ACC switch was switched from on to off. The loss of the unimportant data exerts an insignificant influence upon the user (the possibility of the unimportant data causing an inconvenience to the user is low). The unimportant data is, for example, application data that the user has acquired by downloading it from a server (not shown).

As described above, in a configuration including the main microcomputer 2 and the sub-microcomputer 3, which differ in characteristics (differ in the data to be processed), all the data to be processed by the main microcomputer 2 and the sub-microcomputer 3 are classified according to importance, and the data storage destination and frequency are varied in accordance with the result of classification. Therefore, as shown in FIG. 3, the stored most important data can be retained (prevented from being lost) even if the voltage value of the operating voltage supplied to the sub-microcomputer 3 remains as low as the predetermined value (for example, 0 V) for the predetermined period of time (for example, 50 ms). As a result, the vehicle is up to its expectations, making it possible to establish a system that does not cause the user to feel insecure. The classifications into the most important data, the important data, and the unimportant data may be defined in any manner, for example, by allowing a manufacturer of the vehicle device 1 to predefine the classifications or by allowing the user of the vehicle device 1 to define the classifications after purchasing it.

As described above, the first embodiment is configured so that the vehicle device 1 handles all the data to be processed by the main microcomputer 2 and the sub-microcomputer 3, which differ in characteristics, classifies the data according to importance, varies the data storage destination and frequency in accordance with the result of classification, and constantly stores data classified as the most important data in the built-in RAM 18 in the sub-microcomputer 3. Consequently, even if the battery voltage is momentarily interrupted, the stored data classified as the most important data can be properly retained (prevented from being lost).

Further, data classified as the important data is stored in the external memories 17 when at least of two conditions is established, namely, when the predetermined period of time elapses or the data is changed. Consequently, the data classified as the important data can be periodically stored while considering the capacity of the external memories 17 and the maximum write count.

Furthermore, data classified as the unimportant data is stored in the external memories 17 when the ACC switch is switched from on to off. Consequently, the data classified as the unimportant data can be periodically stored while considering the capacity of the external memories 17 and the maximum write count.

Moreover, when the battery voltage is momentarily interrupted, the supply of the operating voltage to the main microcomputer 2 is shut off. This makes it possible to reduce the power consumption of the main microcomputer 2. Besides, the sub-microcomputer 3 switches from the awake state to the sleep state. This makes it possible to reduce the power consumption of the sub-microcomputer 3.

Second Embodiment

Figure 4:
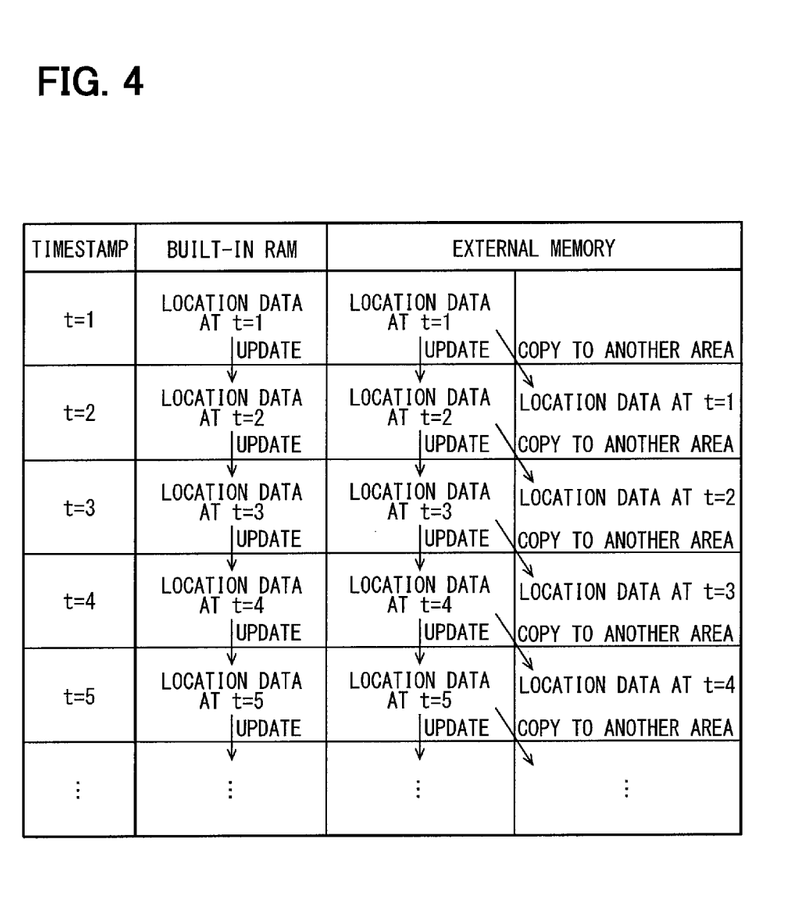
FIG. 4 is a diagram illustrating a data update scheme according to a second embodiment of the present disclosure.

A second embodiment of the present disclosure will now be described with reference to FIG. 4. Elements identical with those of the first embodiment, which has been described above, will not be redundantly described. Elements different from those of the first embodiment will be described below. The built-in RAM 18, which stores the most important data, needs to additionally have a storage area for storing other data such as program data. Therefore, the whole storage area of the built-in RAM 18 cannot be used to store the most important data. In view of such circumstances, the second embodiment is configured so that the sub-microcomputer 3 operates as described below.

When, for instance, the sub-microcomputer 3 chronologically stores location data, which is classified as the most important data, in the built-in RAM 18 (with a timestamp attached to the location data), the sub-microcomputer 3 stores the location data in the external memory 17 as well (stores the location data at two destinations for redundant storage). When latest location data (location data having a timestamp of "t+1") arises, the sub-microcomputer 3 updates the location data in the built-in RAM 18 by storing the latest location data in the built-in RAM 18 and erasing the previously stored second latest location data (location data having a timestamp of "t"). Next, the sub-microcomputer 3 updates the location data in the external memory 17 as well by storing the latest location data in the external memory 17. In the above instance, the sub-microcomputer 3 may erase the previously stored second latest location data or copy it to another storage area. As the above-described configuration is employed, the location data stored before the latest location data arises is retained even when the latest location data is lost. This makes it possible to reduce damage caused by the loss of the latest location data. Further, the external memory 17, which does not provide strict storage area redundancy (has an extra space), is used as a storage destination for the most important data. This makes it possible to store the most important data at two destinations for redundant storage and effectively use a limited storage area of the built-in RAM 18. The location data copied to the other storage area may be continuously handled as the most important data or handled as the important data or the unimportant data by changing its classification.

Third Embodiment

Figure 5:
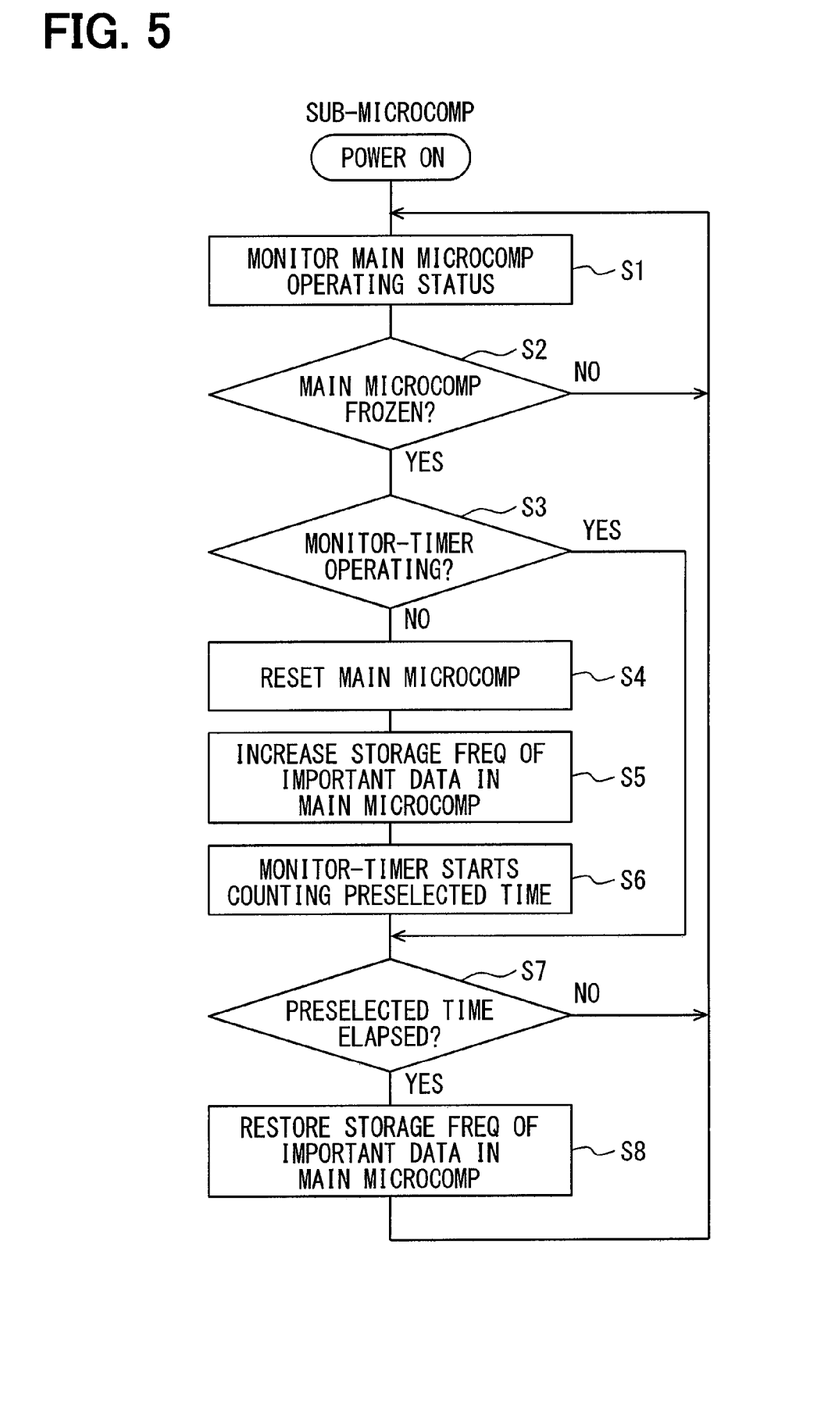
FIG. 5 is a flowchart illustrating an operation of a sub-microcomputer according to a third embodiment of the present disclosure.

A third embodiment of the present disclosure will now be described with reference to FIG. 5. Elements identical with those of the first embodiment, which has been described earlier, will not be redundantly described. Elements different from those of the first embodiment will be described below. After the ACC switch is switched from off to on to place the vehicle device 1 in a steady state, the main microcomputer 2 may suddenly freeze due to a certain cause. In view of such circumstances, the third embodiment is configured so that the sub-microcomputer 3 operates as described below.

The sub-microcomputer 3 inputs the status notification signal from the main microcomputer 2 to monitor the operating status of the main microcomputer 2 (step S1) and determines whether the main microcomputer 2 is frozen (step S2). If, for instance, the input of the status notification signal from the main microcomputer 2 is interrupted, the sub-microcomputer 3 determines that the main microcomputer 2 is frozen by a certain cause (step S2: YES). The sub-microcomputer 3 then determines whether a later-described monitoring timer is operating (step S3). If it is determined that the monitoring timer is not operating (step S3: NO), the sub-microcomputer 3 resets the main microcomputer 2 by outputting a reset signal to the main microcomputer 2 (step S4). In this instance, the sub-microcomputer 3 outputs a storage frequency change signal to the main microcomputer 2 in order to increase the frequency at which the important data is stored in the main microcomputer 2 (in order, for example, to shorten fixed time intervals for the immediate data backup method) (step S5). Then, the sub-microcomputer 3 uses the monitoring timer to start counting a preselected period of time (step S6). When the sub-microcomputer 3 determines that the preselected period of time has elapsed since the monitoring timer started counting the preselected period of time (determines that the monitoring timer has timed out) (step S7: YES), the sub-microcomputer 3 outputs a storage frequency restoration signal to the main microcomputer 2 in order to restore the frequency at which the important data is stored in the main microcomputer 2 to the previous storage frequency (the storage frequency employed before the change) (step S8).

In other words, the main microcomputer 2 resets after it freezes. However, it is conceivable that the main microcomputer 2 may freeze immediately after it resets. In view of such circumstances, it is concluded that the main microcomputer 2 is likely to freeze again until the preselected period of time elapses after the reset of the main microcomputer 2. Thus, the possibility of data being lost when the main microcomputer 2 freezes again can be reduced by increasing the frequency at which the important data is stored in the main microcomputer 2. Further, it is concluded that the main microcomputer 2 is less likely to freeze again after the preselected period of time elapses since the reset of the main microcomputer 2. Thus, data write operations can be performed at an appropriate frequency by restoring the frequency at which the important data is stored in the main microcomputer 2 to the previous storage frequency. Instead of allowing the main microcomputer 2 to input the storage frequency change signal or the storage frequency restoration signal from the sub-microcomputer 3, an alternative is to let the main microcomputer 2 spontaneously change the storage frequency for the important data after it is reset.

Fourth Embodiment

Figure 6:
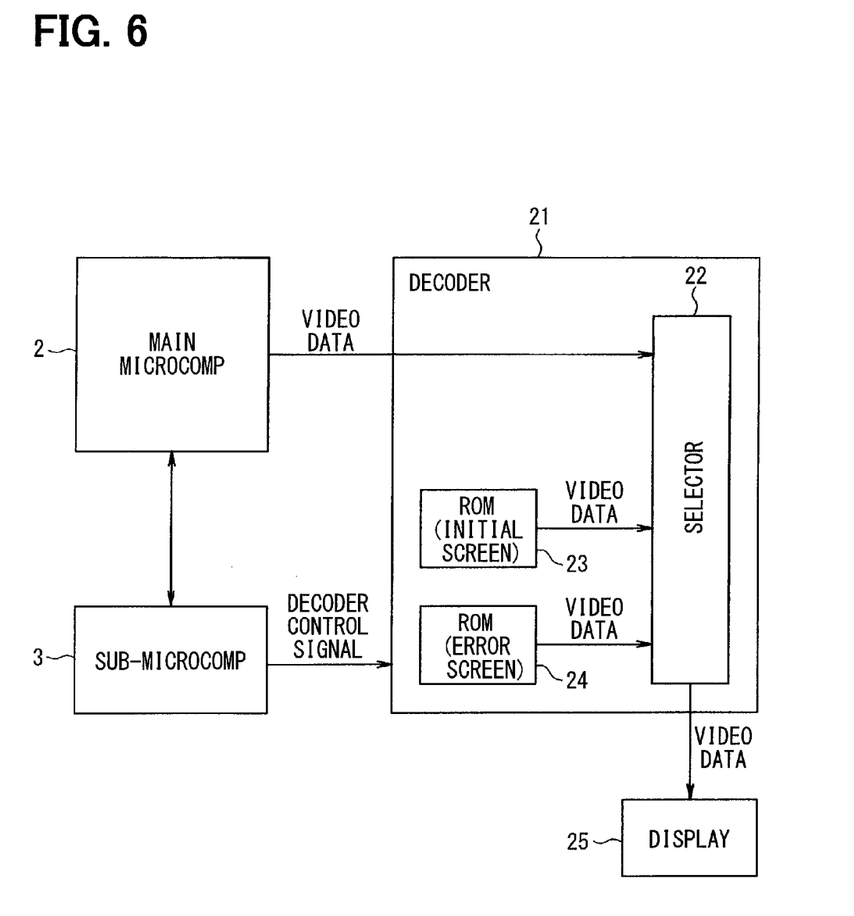
FIG. 6 is a functional block diagram illustrating the vehicle device according to a fourth embodiment of the present disclosure.

A fourth embodiment of the present disclosure will now be described with reference to FIG. 6. Elements identical with those of the first embodiment, which has been described earlier, will not be redundantly described. Elements different from those of the first embodiment will be described below. The main microcomputer 2 and the sub-microcomputer 3 start up when the ACC switch is switched from off to on. However, there is a time lag between when the main microcomputer 2 starts up and when the sub-microcomputer 3 starts up. More specifically, the main microcomputer 2 starts up with a delay and the sub-microcomputer 3 starts up quickly (instantaneously). Therefore, the sub-microcomputer 3 starts up earlier than the main microcomputer 2. If the battery voltage is momentarily interrupted during the time interval between the instant at which the ACC switch is switched from off to on and the instant at which the main microcomputer 2 starts up, it is necessary to shut off the supply of the operating voltage to the main microcomputer 2 during the time interval between momentary battery voltage interruption and battery voltage restoration. However, if the supply of the operating voltage to the main microcomputer 2 is shut off, it is conceivable that a startup screen might be displayed to the user later than usual. In view of such circumstances, the fourth embodiment is configured so that the sub-microcomputer 3 operates as described below.

A decoder 21 includes a selector 22, a ROM 22, and a ROM 23. The ROM 22 stores initial screen video data. The ROM 23 stores error screen video data. When the sub-microcomputer 3 determines that the ACC switch is switched from off to on, the sub-microcomputer 3 outputs a decoder control signal to the decoder 21 to exercise control so that the selector 22 reads the initial screen video data from the ROM 22 and outputs the read initial screen video data to a display 25. As an initial screen is displayed in the above manner, even if the battery voltage is momentarily interrupted during the time interval between the instant at which the ACC switch is switched from off to on and the instant at which the main microcomputer 2 starts up, it is possible to avoid a situation where the startup screen is displayed to the user later than usual. Similarly, when the sub-microcomputer 3 determines that an error has occurred in the main microcomputer 2, the sub-microcomputer 3 outputs a decoder control signal to the decoder 21 to exercise control so that the selector 22 reads the error screen video data and outputs the read error screen video data to the display 25. As an error screen is displayed in the above manner, the user can be immediately notified that an error has occurred in the main microcomputer 2.

Alternative Embodiments

The present disclosure is not limited to the foregoing embodiments. However, the foregoing embodiments may be modified or extended as described below.

The data to be processed by the vehicle device may be classified into two categories or four or more categories instead of being classified into three categories, namely, the most important data, the important data, and the unimportant data.

For the built-in RAM and the external memories, any specifications are acceptable no matter whether they state, for example, the number of units, the capacity, and the maximum write count.

In the third embodiment, an alternative is to manage a history of events in which the main microcomputer 2 froze and set the fixed time intervals for the immediate data backup method in accordance with the history. For example, the fixed time intervals may be set so that the greater the number of times the main microcomputer 2 froze during a unit period of time, the shorter the fixed time intervals.

In the foregoing embodiments, the main microcomputer 2 corresponds to an example of the first data processing unit or first data processing means. The sub-microcomputer 3 corresponds to an example of the second data processing unit or second data processing means. The external memories 17 correspond to an example of the external data storage unit or external data storage means. The built-in RAM 18 corresponds to an example of the built-in data storage unit or built-in data storage means.

While embodiments and configurations according to the present disclosure have been illustrated, it is to be understood that the present disclosure is not limited to the respective embodiments and configurations illustrated above. The present disclosure is intended to cover various other embodiments and configurations that are obtained by combining technical elements disclosed in different embodiments and configurations as appropriate.

What is claimed is:

1. A vehicle device comprising:
   a first data processing unit that processes first data classified as a first category when the first data processing unit is supplied with a first operating voltage that is based on a battery voltage supplied from a vehicle-mounted power source;
   a second data processing unit that processes second data classified as a second category different from the first category when the second data processing unit is supplied with a second operating voltage that is based on the battery voltage supplied from the vehicle-mounted power source;
   an external data storage unit that is externally attached to both the first data processing unit and the second data processing unit and that is capable of storing at least one of the first data and the second data; and
   a built-in data storage unit that is built in the second data processing unit and that is capable of retaining the stored second data even if a voltage value of the battery voltage decreases to a predetermined value for a predetermined period of time,
   wherein at least one of the first data processing unit and the second data processing unit varies a storage destination and a storage frequency in accordance with priorities assigned to the first data and the second data, and
   wherein the second data processing unit constantly stores at least part of the second data in the built-in data storage unit.

2. The vehicle device according to claim 1, wherein when a predetermined condition is established, at least one of the first data processing unit and the second data processing unit stores at least part of not-constantly-stored-data in the external data storage unit, wherein the not-constantly-stored-data is data that is not supposed to be constantly stored in the built-in data storage unit.

3. The vehicle device according to claim 2, wherein when a predestinated period of time has elapsed or a data change occurs, at least one of the first data processing unit and the second data processing unit deems the predetermined condition established and stores at least part of the not-constantly-stored-data in the external data storage unit, the not-constantly-stored-data being the data not supposed to be constantly stored in the built-in data storage unit.

4. The vehicle device according to claim 2, wherein when a predetermined switch of a vehicle is switched from on to off, at least one of the first data processing unit and the second data processing unit deems the predetermined condition established and stores at least part of the not-constantly-stored-data in the external data storage unit, the not-constantly-stored-data being the data not supposed to be constantly stored in the built-in data storage unit.

5. The vehicle device according to claim 1, wherein when the voltage value of the battery voltage decreases to the predetermined value for the predetermined period of time, the second data processing unit exercises control to shut off supply of the operating voltage to the first data processing unit.

6. The vehicle device according to claim 5, wherein the second data processing unit switches from a normal operating state to a low-power operating state after exercising the control to shut off the supply of the operating voltage to the first data processing unit.

7. The vehicle device according to claim 1, wherein the second data processing unit stores in the external data storage unit a copy of the data constantly stored in the built-in data storage unit.

8. The vehicle device according to claim 7, wherein when the second data processing unit updates the data constantly stored in the built-in data storage unit, the second data processing unit updates a specific data stored in the external data storage unit, wherein the specific data is the copy of the data stored in the built-in data storage unit before update.

9. The vehicle device according to claim 8, wherein when the second data processing unit updates the data constantly stored in the built-in data storage unit, the second data processing unit updates the specific data stored in the external data storage unit and deletes the specific data before the update from the external data storage unit, wherein the specific data is the copy of the data stored in the built-in data storage unit before the update.

10. The vehicle device according to claim 1, wherein:
when the first data processing unit freezes, the second data processing unit resets the first data processing unit; and
when the first data processing unit is reset, the first data processing unit sets the storage frequency of the first data to be higher than before the first data processing unit is reset.

11. The vehicle device according to claim 10, wherein
when a preselected period of time has elapsed since the first data processing unit set the storage frequency of the first data to be higher than before the first data processing unit is reset, the first data processing unit restores the storage frequency of the first data to the storage frequency that was used before the reset.

* * * * *